(12) United States Patent
Zhang et al.

(10) Patent No.: US 11,655,953 B2
(45) Date of Patent: May 23, 2023

(54) PBS-BASED ADB FUNCTION ADJUSTMENT METHOD AND INTELLIGENT VEHICLE LIGHT MODULE THEREFOR

(71) Applicant: HASCO VISION TECHNOLOGY CO., LTD., Shanghai (CN)

(72) Inventors: Jie Zhang, Shanghai (CN); Shikun Dong, Shanghai (CN); Fan Meng, Shanghai (CN); Feiquan Li, Shanghai (CN); Jiayuan Chen, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 372 days.

(21) Appl. No.: 17/259,781

(22) PCT Filed: May 27, 2019

(86) PCT No.: PCT/CN2019/088546
§ 371 (c)(1),
(2) Date: Jan. 12, 2021

(87) PCT Pub. No.: WO2020/010936
PCT Pub. Date: Jan. 16, 2020

(65) Prior Publication Data
US 2022/0373151 A1 Nov. 24, 2022
US 2022/0373151 A1 Nov. 24, 2022

(30) Foreign Application Priority Data

Jul. 13, 2018 (CN) .......................... 201810771191.X
Jul. 13, 2018 (CN) .......................... 201821113805.7

(51) Int. Cl.
*B60Q 1/00* (2006.01)
*F21S 41/64* (2018.01)
(Continued)

(52) U.S. Cl.
CPC .......... *F21S 41/645* (2018.01); *B60Q 1/0023* (2013.01); *F21S 41/143* (2018.01);
(Continued)

(58) Field of Classification Search
CPC .............. B60Q 1/085; B60Q 2300/334; B60Q 2300/333; B60Q 2300/332; B60Q 2300/322; B60Q 1/00
See application file for complete search history.

(56) References Cited

U.S. PATENT DOCUMENTS 10,174,894 B2 * 1/2019 Sugiyama ............... F21S 41/16
2009/0279316 A1 * 11/2009 Hikmet .................. B60Q 1/085
362/465

* cited by examiner

*Primary Examiner* — William J Carter
(74) *Attorney, Agent, or Firm* — CBM Patent Consulting, LLC

(57) ABSTRACT

Disclosed are PBS-based ADB function adjustment method and an intelligent vehicle light module therefor. A light source system and a light control element constitute an intelligent illumination light control system. One part of light rays emitted by the intelligent illumination light control system penetrate through a PBS to form an illumination light shape, and the other part of the light rays emitted by the intelligent illumination light control system are reflected by the PBS in a direction opposite to a photosensitive chip integrated circuit. Ambient light enters an imaging lens group in a direction opposite to an illumination light path, and one part of the ambient light is reflected by the PBS to the photosensitive chip integrated circuit to form an information source for dynamic control of the light control system.

17 Claims, 9 Drawing Sheets

(51) Int. Cl.
*F21S 41/143* (2018.01)
*F21S 41/255* (2018.01)
*F21S 41/657* (2018.01)
F21Y 115/10 (2016.01)
F21W 102/20 (2018.01)

(52) U.S. Cl.
CPC ........... *F21S 41/255* (2018.01); *F21S 41/657* (2018.01); *F21W 2102/20* (2018.01); *F21Y 2115/10* (2016.08)

PBS-BASED ADB FUNCTION ADJUSTMENT METHOD AND INTELLIGENT VEHICLE LIGHT MODULE THEREFOR

BACKGROUND OF THE INVENTION

Technical Field

The invention relates to vehicle lights, in particular to a PBS-based function adjustment method and a camera-integrated intelligent vehicle light module therefor, and more particularly relates to a PBS-based intelligent vehicle light module which is integrated with a camera integrated circuit.

Description of Related Art

The continuing safety problem of night driving of vehicles has put forward higher requirements for the ADB technique of novel intelligent vehicle lights. The ADB technique of the novel intelligent vehicle lights aims to realize variable-light shape vehicle lights with an AFS function and an ADB function.

In an ideal condition, the ADB function enables the intelligent headlight to form a dark area as small as the head of the opposite driver at different positions and maintain a high illuminating brightness in the other spaces without any target, so that the opposite driver will not be dazzled, and our party can illuminate any areas on the driving road to the maximum extent.

To realize the ADB function, changes of illumination light shapes, namely dynamic illumination, are needed, and different illumination light shapes need to be formed according to different vehicle speeds and road conditions.

As one existing solution, the matrix headlight based on the MATRIX technique divides an illumination space of the whole headlight into different continuous blocks, which adopt different numbers of LEDs for illumination, such that a dark area as small as about 1° can be provided by switching off the LEDs in specific blocks.

For example, Chinese Invention Patent Application No.201210421033.4 discloses a headlight projection module, wherein as described in [0010], the configuration requirements of a main optical unit are associated with the angle range of a single local area formed on the lane by the projection of a light distribution along the sight of the driver. Thus, the imaging pixels should have an angle of only several degrees (such as 1°), and the vertical angle range of the imaging pixels is a bit larger. The light distribution can be precisely changed by operating one or more target LEDs of the front headlight module to realize, for example, a local driving beam or a sign beam. As for the local driving beam, an area, in which other traffic participators have been detected, in the light distribution region can be shielded by switching off a target LED. As for the sign beam, a detected target in front of a motor vehicle can be illuminated by activating a target LED to raise the attention from the driver of the motor vehicle.

However, the above patent realizes a dark area required by the ADB function by means of static switching-off of LEDs (namely LED light-emitting chips) and has the following defects:

(1) The number of imaging pixels is equal to the number of LED light-emitting chips, so that a large number of LEDs are required to realize a high resolution, a corresponding control circuit board is more complicated, the complexity and manufacturing difficulty of optical conductors of the primary optical units are greatly improved, and the cost is increased. In addition, due to the space limitation of the vehicle lights, the number of LED light-emitting chips that can be used is limited, which leads to a limited number of pixels of the projection module.

(2) Existing lights capable of realizing an adjustable illumination scope, including the matrix headlight, also have a common problem that the minimum angle of a dark area formed by the system is still too large. That is to say, although the dark area can prevent the driver of a target vehicle against dazzle light, the scope of the dark area substantially exceeds the width required by the target vehicle, which leads to an illumination loss of our party. For example, the matrix headlight mentioned above can provide a dark area as small as 1°. However, the actual transverse width of the dark area depends on the distance between the target vehicle and our party, for example, if the ADB is expected to come into effect 400 m away, the width of the dark area at this position is (400 m*tan1°)=6.98 m, the actual width of the vehicle (such as a common passenger car) is about 1.9 m, and obviously, the dark area is too large.

In view of this, it is necessary to form a very small dark area to improve the control precision of vehicle lights. Correspondingly, the communication and control cycle should be shortened to drastically reduce error sources and misjudgments caused by different installation positions of a camera and a vehicle light.

In addition, an existing ADB (adaptive driving beam) typically acquires road information by means of a camera arranged on the inner side of a windshield, communicates with an intelligent vehicle light module through a vehicle body network after analyzing and processing the road information, and controls the intelligent vehicle light module to change the light shape to improve the illumination effect and the driving safety, reduce the cost and ensure that the vehicle light can provide an illumination as bright as possible without dazzling other vehicles on the road.

However, the existing ADB has the following problems:

1. On account of a series of error sources such as calibration errors of the camera and the vehicle light, the illumination light shape cannot be accurately controlled, thus greatly reducing the ADB illumination effect.

For example, the existing camera is generally arranged near a rearview mirror on the inner side of the front windshield, accumulative errors of the assembly relations between the camera and the windshield, between the windshield and the vehicle body, as well as between the vehicle light and the vehicle body may lead to large errors between the camera and the vehicle light, and consequentially, it is difficult to realize accurate matching of the illumination reference of the vehicle light and the reference position of the camera.

2. Due to different installation positions of the camera and the vehicle light, there will be a difference between the view angle of the camera and the illumination range of the vehicle light, and misjudges may be made.

Because the camera is far away from the vehicle light and is located at a high position, while the vehicle light is located at a low position, there will inevitably be a difference between the reference center of the camera and the reference center of the vehicle light, and vehicles captured by the camera may not be definitely dazzled by the vehicle light. For example, when the vehicle travels on a road with an isolation belt, the illumination of the vehicle light may be shielded by the isolation belt, while the vehicles from the opposite direction can be captured by the camera.

3. Reduction of the Response Time

Due to the fact that the existing camera is installed away from the vehicle light and communicates with the vehicle light module through the vehicle body network and the vehicle body network has a communication cycle of 33 ms, a response delay of the vehicle light will be caused by a series links including acquiring the road information by the camera, carrying out computation, sending a processing result to the vehicle light by network communication, acquiring the information from the network by the vehicle light and carrying out light shape shielding by the vehicle light.

That is, the camera and the intelligent vehicle light module belong to different systems, and a communication delay between the systems results in a delay from the moment a vehicle is found to the moment an ADB response is given, which goes against the requirement for a quick response under a high-speed driving condition.

BRIEF SUMMARY OF THE INVENTION

To solve the aforesaid problems, one objective of the invention is:

to eliminate or drastically reduce the delay from the moment a vehicle is found to the moment an ADB response is given to ensure that a vehicle can give an ADB response quickly when traveling at a high speed;

to eliminate or drastically reduce a series of error sources such as calibration errors of a camera and a vehicle light (or other errors) to ensure that a vehicle can accurately control an illumination light shape when traveling at a high speed, thus greatly improving the ADB illumination effect.

In addition, the invention adopts a liquid crystal, LCOS or DMD high-resolution light control system, and thus can generate an extremely small dark area and greatly improve the control precision of a vehicle light. For example, if the light control system has a transverse resolution of 1024 pixels and an illumination width of 10°, the angle of a dark area corresponding to the central pixel is about 0.01°, which is much smaller than the angle, namely about 1°, of a dark area in the prior art.

Thus, one objective of the invention is to shorten the communication and control cycle by camera integration to drastically reduce error sources and misjudgments caused by different installation positions of a camera and a vehicle light.

In addition, another objective of the invention is to provide different illumination light shapes according to different vehicle speed and road conditions to improve the illuminating effect and the driving safety, reduce the cost, and ensure that a vehicle light can provide an illumination as bright as possible without dazzling other vehicles on a road.

One objective of the invention is to provide a PBS-based ADB function adjustment method and a novel vehicle light system therefor, which realize an ideal high-beam illumination light shape with the brightness becoming dark gradually from the center by means of light energy distribution control fulfilled by superposition of dynamic light shapes.

Another objective of the invention is to provide a PBS-based ADB function adjustment method and a novel vehicle light system therefor, which improve the ADB uniformity by means of a dynamic change and superposition of light shapes.

Another objective of the invention is to provide a PBS-based ADB function adjustment method and a novel vehicle light system therefor, which can realize a smaller dark area and significantly improve the control precision of an ADB, compared with an existing ADB function realized by multiple LED light-emitting chips arranged in a matrix and static switching-off.

Another objective of the invention is to provide a PBS-based ADB function adjustment method and a novel vehicle light system therefor, which adopt multiple LED light-emitting chips and carry out forward or backward defocusing with respect to the focal point of a lens or a lens group to realize multi-dimensional ADB function adjustment, that is, ADB function control is carried out for upper, lower, left and right objects in front of a vehicle light by different distances.

The technical solution adopted by the invention to fulfill the above objectives is as follows:

A PBS-based ADB function adjustment method adopts a camera-integrated intelligent vehicle light module which comprises an intelligent illumination light control system composed of a light source system and a light control element and an integrated intelligent vehicle light module composed of a photosensitive chip integrated circuit and an imaging lens group, and is characterized in that:

The intelligent illumination light control system comprises a PBS, a camera CMOS chip and an imaging lens group, wherein the PBS is provided with an LCD, an LCOS chip or a DMD chip opposite to the imaging lens group, the LCD is controlled through a liquid crystal technique, the LCOS chip is a reflective liquid crystal technique, the DMD chip is micromirror wafer technique, and the LCD, the LCOS chip and the DMD chip are used to realize a dark area;

One part of light rays emitted by the intelligent illumination light control system penetrate through the PBS and are irradiated on the imaging lens group to finally form an illumination light shape;

The other part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;

Ambient light enters the imaging lens group in a direction opposite to an illumination light path;

One part of the ambient light is reflected by the PBS to the photosensitive chip integrated circuit to form an information source, information about vehicles and pedestrians on a road is determined after analysis and processing by a computing system of the integrated circuit, and the intelligent illumination light control system is controlled to carry out ADB function adjustment and control.

The PBS-based ADB function adjustment method of the invention is characterized in that the PBS is arranged on a focal point or a focal plane of a lens or the imaging lens group.

The PBS-based ADB function adjustment method of the invention is characterized in that a camera shares one lens or imaging lens group with a vehicle light, the intelligent illumination light control system and the PBS.

The PBS-based ADB function adjustment method of the invention is characterized in that one part of light rays emitted by the intelligent illumination light control system penetrate through the PBS and are irradiated on the imaging lens group to finally form an illumination light shape.

The PBS-based ADB function adjustment method of the invention is characterized in that the other part of the light rays emitted by the intelligent illumination light control system are reflected by the PBS in a direction opposite to the camera CMOS chip, so that the illumination light rays are prevented from being irradiated onto the photosensitive chip, which may otherwise disturb the photosensitive chip.

The PBS-based ADB function adjustment method of the invention is characterized in that the light source system of the camera-integrated intelligent vehicle light module collimates Lambertian-like divergent light rays emitted by an LED light source through a lens corresponding to the light source to form illumination light rays nearly in parallel, the illumination light rays pass through the PBS and the imaging lens group to form a primary light spot and a primary light shape thereof on a front vertical screen, and the primary light shape is an intensive light spot formed around the primary light spot;

The light source is transversely displaced with respect to the lens corresponding to the light source to form a secondary spot light and a continuous secondary light shape thereof;

On this basis, the light source is switched off when moving to a certain position in each cycle, and is in an on state in the other positions, such that a light shape having a dark area is formed on the front vertical screen when the light source is located at the switched-off position, and the method of forming a dark area by the LCD, the LCOS chip or the DMD chip arranged on the PBS and opposite to the imaging lens group can be replaced to realize an ADB function.

The PBS-based ADB function adjustment method of the invention is characterized in that:

The primary light shape is a 0.5° intensive light spot formed around the primary light spot.

The PBS-based ADB function adjustment method of the invention is characterized in that the dark area includes a transitional dark area formed in the moving process of the light source and located between the primary light source and the dark area formed when the light source moves to the switched-off position, namely a low-brightness transitional area, and a real dark area corresponding to the switched-off position of the light source.

The PBS-based ADB function adjustment method of the invention is characterized in that a secondary light distribution component is additionally disposed between the light source and the lens corresponding to the light source to change a light shape, and the secondary light distribution component is used to change the primary light shape in shape and position.

The PBS-based ADB function adjustment method of the invention is characterized in that the light source quickly and linearly reciprocates in a transverse area to form a continuous illumination light shape.

The PBS-based ADB function adjustment method of the invention is characterized in that a rotary light source device is used to enable the light source to quickly and linearly reciprocate with respect to the lens.

The PBS-based ADB function adjustment method of the invention is characterized in that a rotary light source system comprises a light source assembly composed of a LED light-emitting chip and a metal substrate, and the light source assembly is able to rotate at a high speed around a normal rotation axis of a light-emitting surface, wherein the rotation frequency of the light source assembly is not lower than a visually recognizable frequency.

The PBS-based ADB function adjustment method of the invention is characterized in that the rotary light source system comprises a heat sink arranged on the LED light-emitting chip.

The PBS-based ADB function adjustment method of the invention is characterized in that the movement frequency of the LED light-emitting chip is 50-500 HTz, and the on-off frequency of the LED light-emitting chip 1000-50000 HTz.

The PBS-based ADB function adjustment method of the invention is characterized in that the light source comprises multiple LED light-emitting chips that can be defocused forward or backward by 0-5 mm with respect to the focal point of the lens or lens group corresponding to the light source to realize multi-dimensional ADB function adjustment.

The PBS-based ADB function adjustment method of the invention is characterized in that the movement frequency of the LED light-emitting chip is 50 THz, the on-off frequency of the LED light-emitting chip is 1000 THz, and the rotary light source is switched on or off every 1 ms to form a 0.5° dark area around a real dark area, namely the low-brightness transitional area, and the real dark area formed when the light source is switched off within 1 ms.

The PBS-based ADB function adjustment method of the invention is characterized in that the displacement frequency of the light source with respect to the corresponding lens is greater than the number of visually recognizable frames, that is, the displacement frequency is greater than 30 frames per second.

A camera-integrated intelligent vehicle light module comprises an intelligent illumination light control system composed of a light source system and a light control element and an integrated intelligent vehicle light module composed of a camera CMOS integrated circuit and an imaging lens group, and is characterized in that:

The intelligent illumination light control system comprises an LCD, an LCOS chip or a DMD chip which is arranged on a PBS and opposite to the imaging lens group, the LCD is controlled through a liquid crystal technique, the LCOS chip is a reflective liquid crystal technique, the DMD chip is micromirror wafer technique, and the LCD, the LCOS chip and the DMD chip are used to realize a dark area;
  The intelligent illumination light control system further comprises the PBS;
  One part of light rays emitted by the intelligent illumination light control system penetrate through the PBS and are irradiated on the imaging lens group to finally form an illumination light shape;
  The other part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;
  Ambient light enters the imaging lens group in a direction opposite to an illumination light path;
  One part of the ambient light is reflected by the PBS to a photosensitive chip integrated circuit to form an information source to convert a light signal into an electric signal, and a computing system analyzes the electric signal to draw a conclusion and transmits an operation result to an execution system of a control circuit board including the LCD, the LCOS chip and the DMD chip; after the operation result is analyzed and processed, information about vehicles and pedestrians on a road is determined; and the intelligent illumination light control system is controlled to carry out ADB function adjustment and control.

The camera-integrated intelligent vehicle light module of the invention is characterized in that a camera shares one lens or imaging lens group with a vehicle light, the intelligent illumination light control system and the PBS.

The camera-integrated intelligent vehicle light module of the invention is characterized in that one part of light rays emitted by the intelligent illumination light control system penetrate through the PBS and are irradiated on the imaging lens group to finally form an illumination light shape meeting law requirement.

The camera-integrated intelligent vehicle light module of the invention is characterized in that the other part of the light rays emitted by the intelligent illumination light control system are reflected by the PBS in a direction opposite to the camera CMOS chip, so that the illumination light rays are prevented from being irradiated onto the photosensitive chip, which may otherwise disturb the photosensitive chip.

The camera-integrated intelligent vehicle light module of the invention is characterized in that the movement frequency of LED light-emitting chips is 50 THz, the on-off frequency of the LED light-emitting chips is 1000 THz, and the rotary light source is switched on or off every 1 ms to form a 0.5° dark area around a real dark area, namely the low-brightness transitional area, and the real dark area formed when the light source is switched off within 1 ms.

The camera-integrated intelligent vehicle light module of the invention is characterized in that the displacement frequency of the light source with respect to the corresponding lens is greater than the number of visually recognizable frames, that is, the displacement frequency is greater than 30 frames per second.

The camera-integrated intelligent vehicle light module of the invention of the invention is characterized in that the size of a light spot depends on the light-emitting area and shape of the light source and the form of the lens, such as a collimating lens or a unidirectional-diffusion lens.

A rotating motor for driving an LED light-emitting chip to rotate is arranged behind the LED light-emitting chip, and the rotation center of the rotary light source may be the center of the light-emitting chip and is perpendicular to the rotation axis of a light-emitting surface.

The rotating motor drives a movement mechanism to enable the LED light-emitting chip and a heat sink of the LED light-emitting chip to reciprocate linearly or to rotate around a rotation center.

The camera-integrated intelligent vehicle light module of the invention is characterized in that the light source comprises multiple LED light-emitting chips that can be defocused forward or backward by 0-5 mm with respect to the focal point of the lens or lens group corresponding to the light source to realize multi-dimensional ADB function adjustment.

Preferably, the light source comprises 1-10 LED light-emitting chips that can be defocused forward or backward by 0-5 mm with respect to the focal point of the lens or lens group corresponding to the light source to realize multi-dimensional ADB function adjustment. The rotating motor drives the movement mechanism to enable the light source to be defocused forward or backward by 0-5 mm with respect to the focal point of the lens or lens group.

That is, ADB function control is carried out for upper, lower, left and right objects in front of the vehicle light by different distances.

The camera-integrated intelligent vehicle light module of the invention is characterized in that the light source comprises multiple LED light-emitting chips, and gaps between the multiple LED light-emitting chips are 0.1 mm-0.5 mm.

Rectangular light-emitting chips may be 1 mm*1-5 mm rectangular light-emitting chips, and square light-emitting chips may be 1-5 mm*1-5 mm square light-emitting chips.

According to the PBS-based camera-integrated intelligent vehicle light module provided by the invention, the light source system and the light control element constitute the intelligent illumination light control system, and the PBS, the camera CMOS integrated circuit and the imaging lens group constitute the camera-integrated intelligent vehicle light module.

The intelligent illumination light control system may be an LCD, an LCOS chip or a SMD chip. One part of light rays emitted by the intelligent illumination light control system penetrate through the PBS and are irradiated on the imaging lens group to finally form an illumination light shape. The other part of light rays emitted by the intelligent illumination light control system are reflected by the PBS in a direction opposite to the camera CMOS chip. Ambient light enters the imaging lens group in a direction opposite to an illumination light path, and one part of the ambient light is reflected by the PBS to the camera CMOS integrated circuit to form an information source which is analyzed and processed to determine information about vehicles and pedestrians on a road, and the intelligent illumination light control system is controlled to carry out dynamic control. The camera-integrated intelligent module can reduce error sources and shorten the response time. In addition, the camera system and the intelligent vehicle light system share one lens group, so that the number of parts and the cost are reduced, and the utilization rate of the lens group is increased.

According to the PBS, a polarized splitting prism can split incident non-polarized light into two perpendicular beams of polarized light, wherein the polarized light P completely passes through the PBS, the polarized light S is reflected at an angle of 45°, and a 90° angle is formed between the emergent direction of the polarized light S and the polarized light P. The polarized splitting prism is formed by a pair of high-precision right-angle prisms that are glued together, wherein the hypotenuse of one prism is plated with a polarized splitting dielectric film.

The camera CMOS-integrated circuit is a current biasing circuit (there are two types of biasing circuits, namely current biasing circuit and voltage biasing circuit).

The LCD is a crystal configured between two parallel pieces of glass to contain liquid, and many vertical and horizontal tiny wires are disposed between the two pieces of glass and may be electrified to control direction changes of rod-shaped crystal molecules to refract light to generate a picture.

The LCOS chip is a novel reflective display technique realized by organically combining LCD and CMOS integrate circuits, and LCOS, as a novel display device, has the advantages of large screen, high brightness, high resolution, power saving and the like.

The DMD chip is a digital light processing technique which carries out digital processing on an image signal and then projects light out and is a technique that can realize visual digital information display based on the DMD (Digital Micromirror Device) developed by TI (Texas Instruments) Co., Ltd.

According to the invention, the camera-integrated intelligent module can reduce error sources and shorten the response time. In addition, the camera system shares one lens group with the intelligent vehicle light system, so that the number of parts and the cost are reduced, and the utilization rate of the lens group is increased.

According to the invention, error sources are reduced, so that the control precision of the intelligent vehicle light module is improved. The response time can be greatly shortened.

Figures 1A, 1B, 1C:
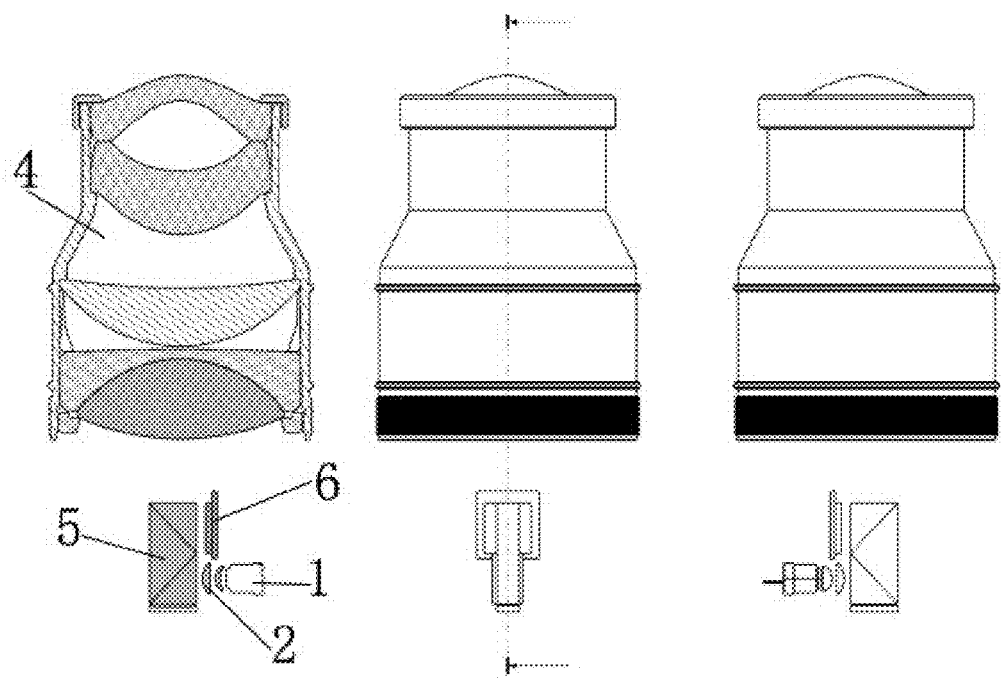
FIG. 1A is one view of a camera-integrated intelligent vehicle light module for an ADB function adjustment method of the invention.
FIG. 1B is one view of a camera-integrated intelligent vehicle light module for an ADB function adjustment method of the invention.
FIG. 1C is one view of a camera-integrated intelligent vehicle light module for an ADB function adjustment method of the invention.
Figure 2:
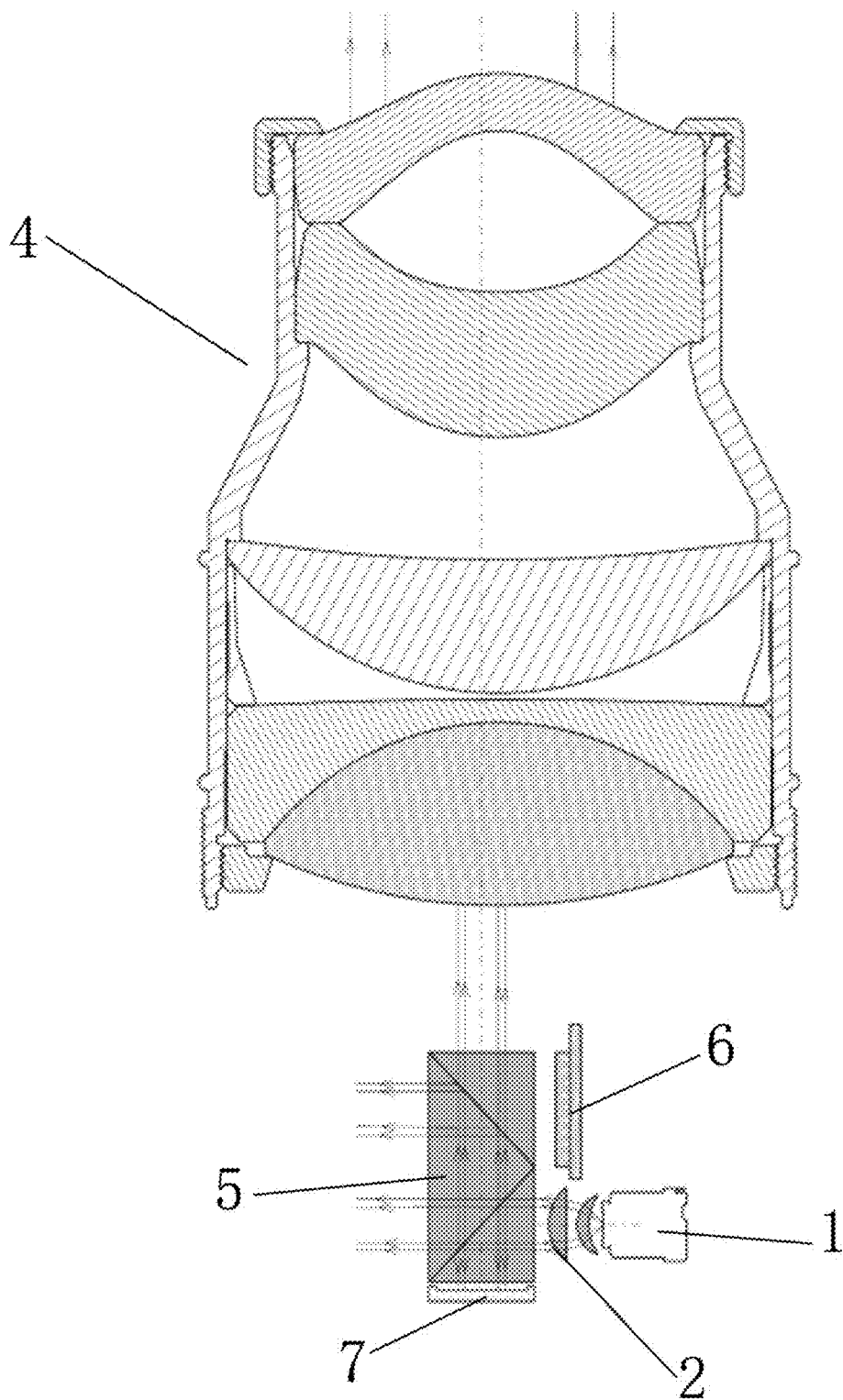
FIG. 2 is a schematic diagram of a light path of the camera-integrated intelligent vehicle light module of the invention.
Figure 3:
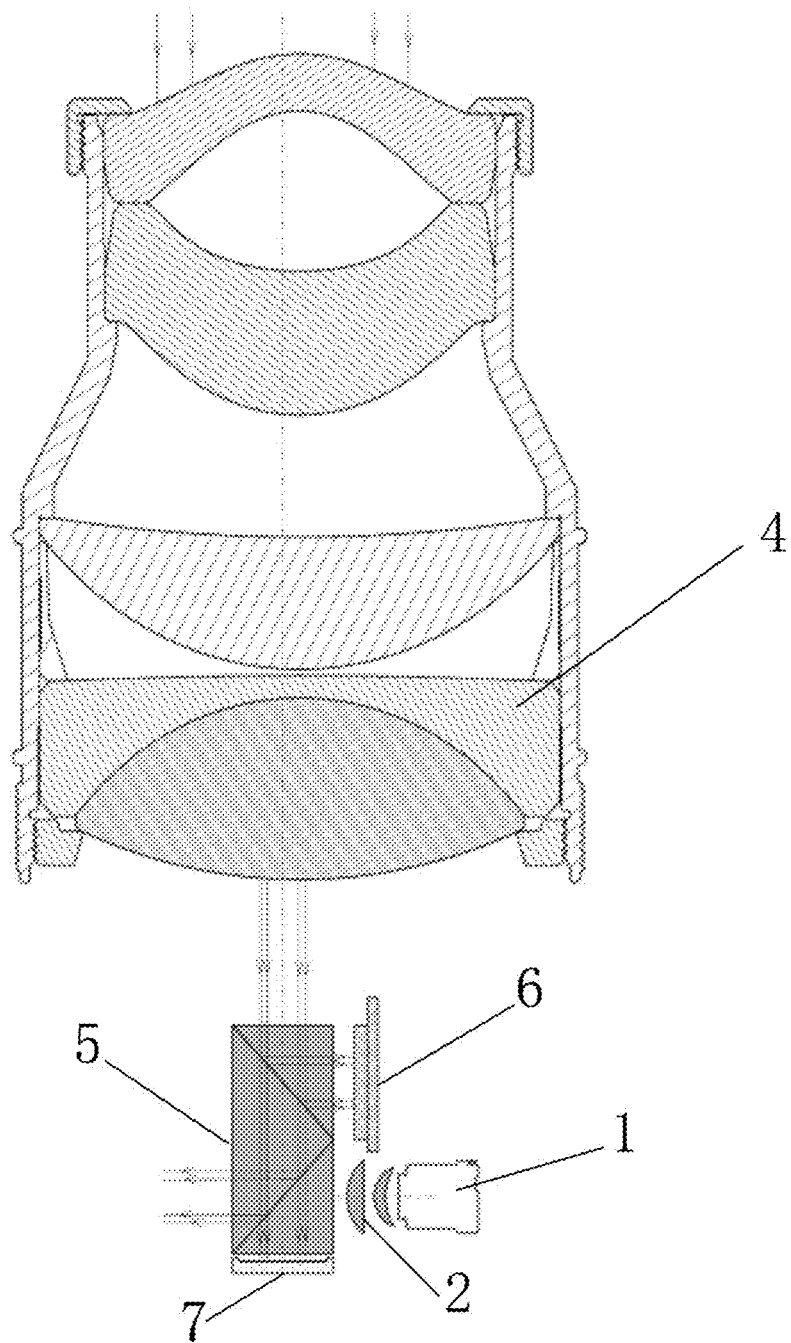
FIG. 3 is a schematic diagram of an ambient light path of the camera-integrated intelligent light module of the invention.
Figures 4A, 4B, 4C:
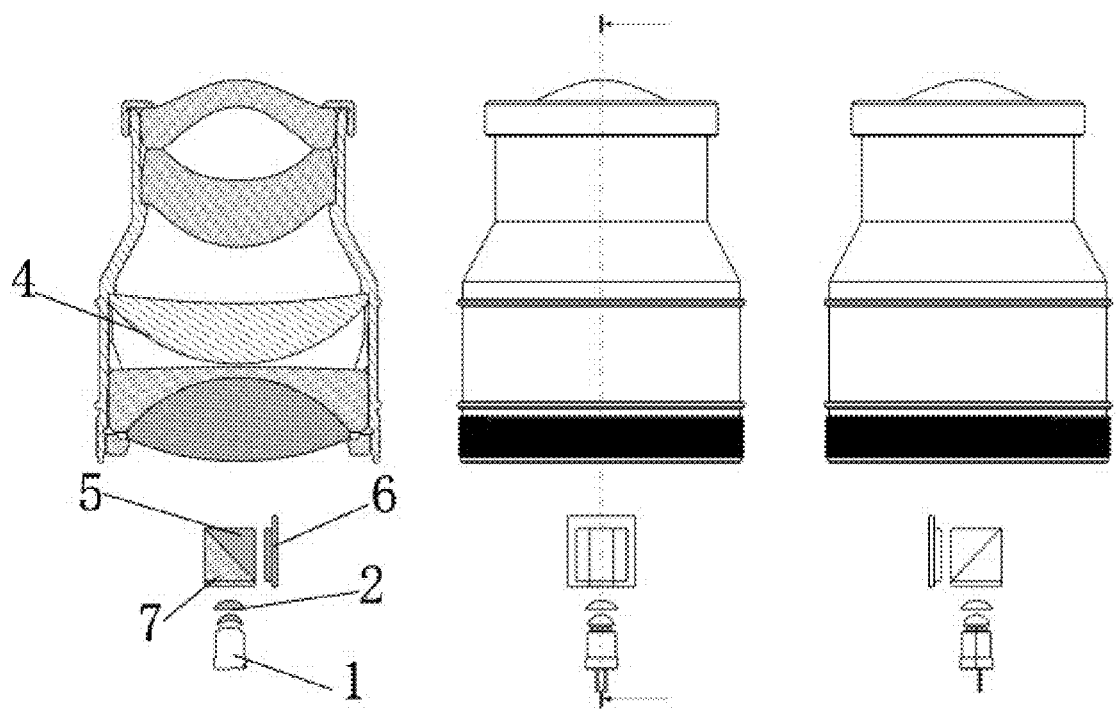
FIG. 4A is one view of a LCD control system of the camera-integrated intelligent vehicle light module of the invention.
FIG. 4B is one view of a LCD control system of the camera-integrated intelligent vehicle light module of the invention.
FIG. 4C is one view of a LCD control system of the camera-integrated intelligent vehicle light module of the invention.
Figures 5A, 5B, 5C:
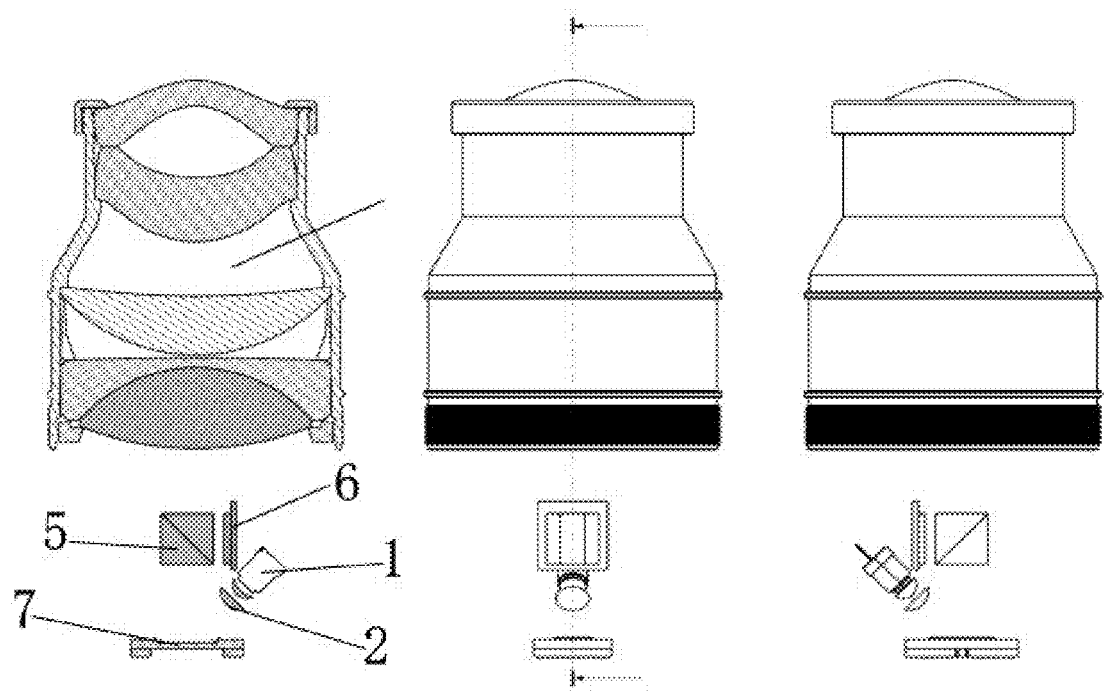
FIG. 5A is one view of a DMD control system of the camera-integrated intelligent vehicle light control module of the invention.
FIG. 5B is one view of a DMD control system of the camera-integrated intelligent vehicle light control module of the invention.
FIG. 5C is one view of a DMD control system of the camera-integrated intelligent vehicle light control module of the invention.
Figure 6:
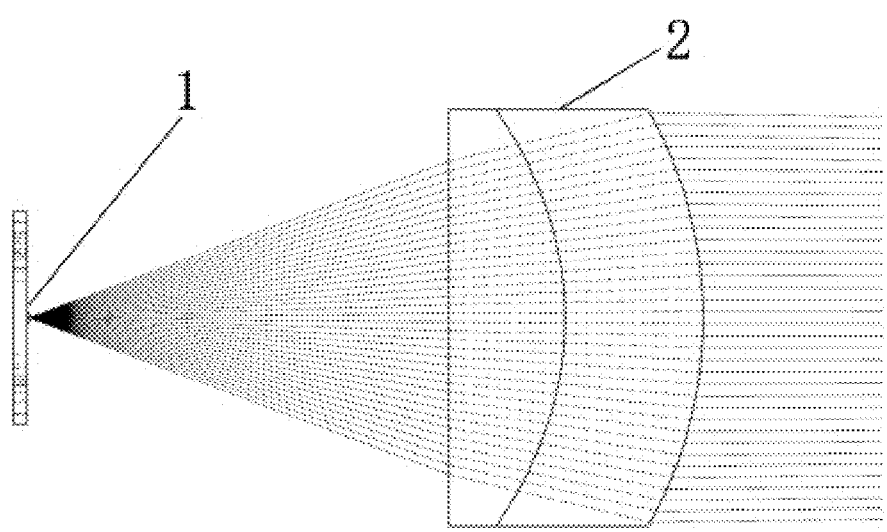
FIG. 6 is a schematic diagram of a light path of a light source system of the invention.
Figure 7:
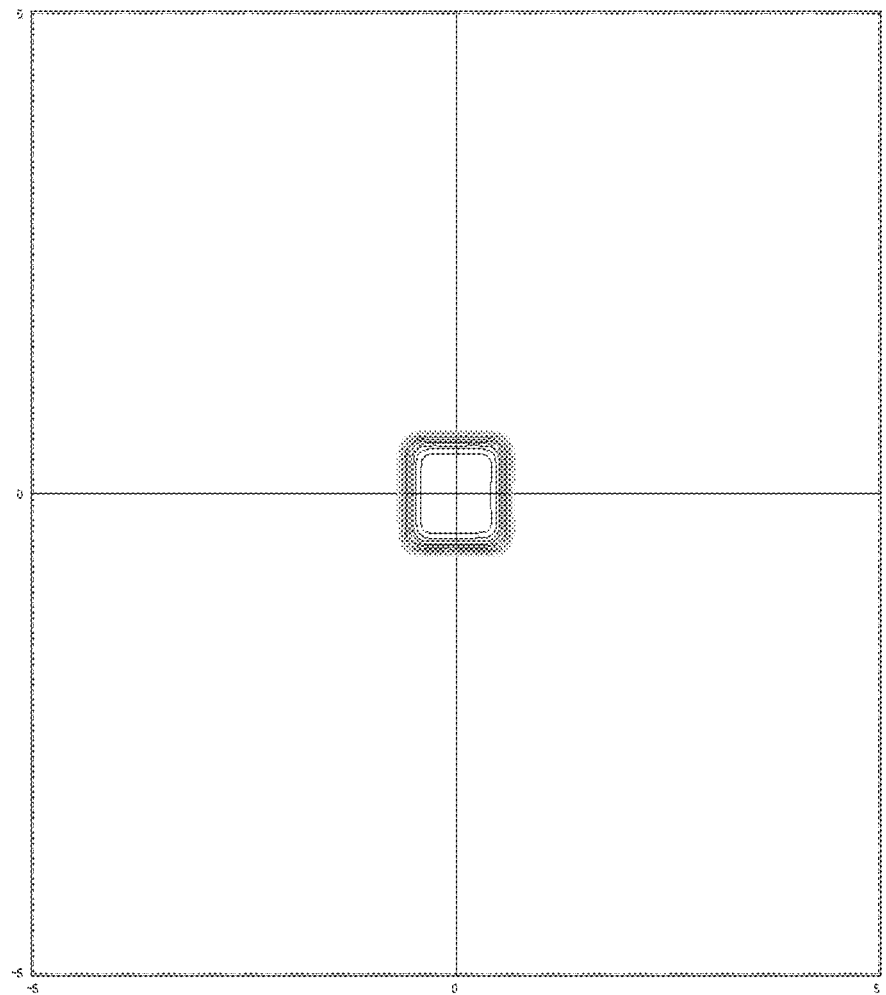
FIG. 7 is a schematic diagram of a light shape formed on a screen corresponding to the focal point of a square LED light-emitting chip of the invention.
Figure 8:
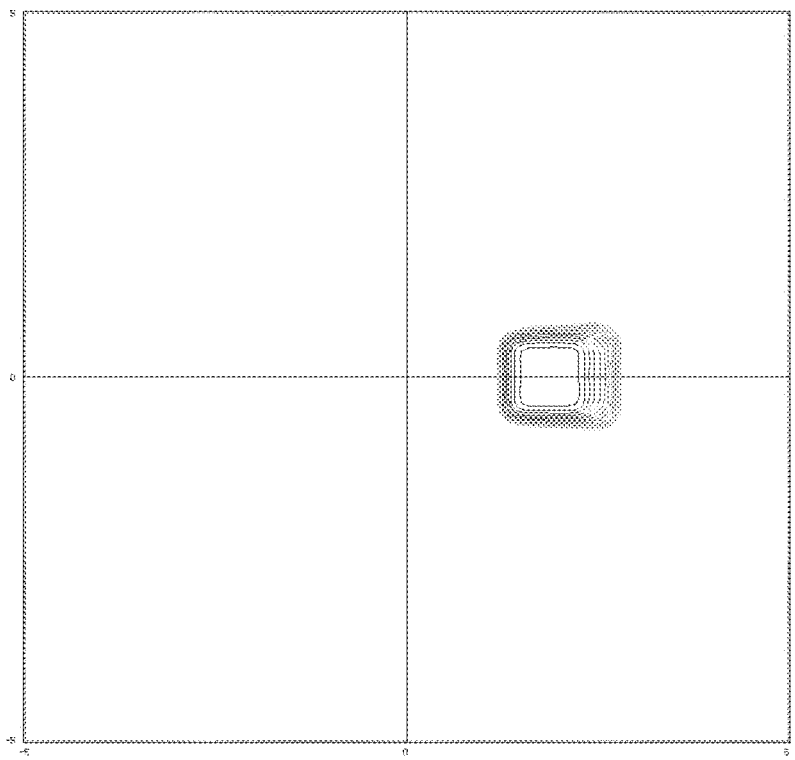
FIG. 8 is a schematic diagram of a light shape formed on the screen when the square LED light-emitting chip is transversely displaced of the invention.
Figure 9:
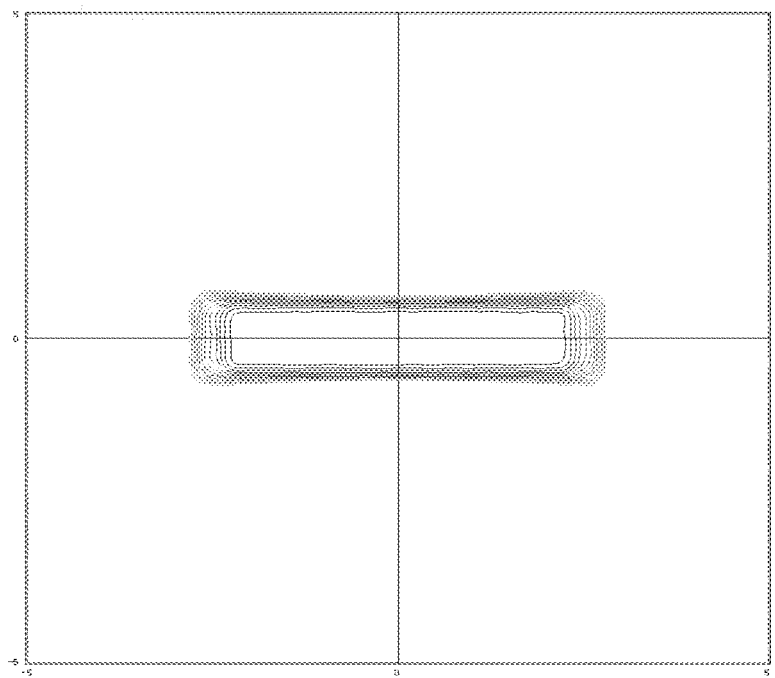
FIG. 9 is a schematic diagram of a light shape formed on the screen when the square LED light-emitting chip transversely and quickly reciprocates of the invention.
Figure 10:
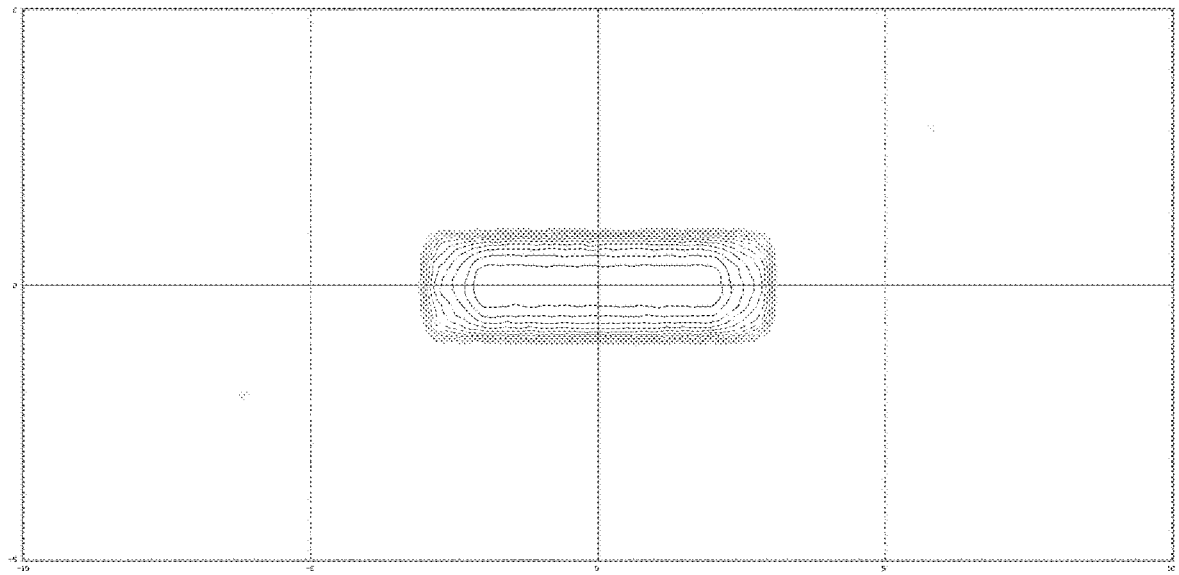
FIG. 10 is a schematic diagram of a light shape formed on a screen when a rectangular LED light-emitting chip is defocused forward or backward by 1 mm of the invention.
Figure 11:
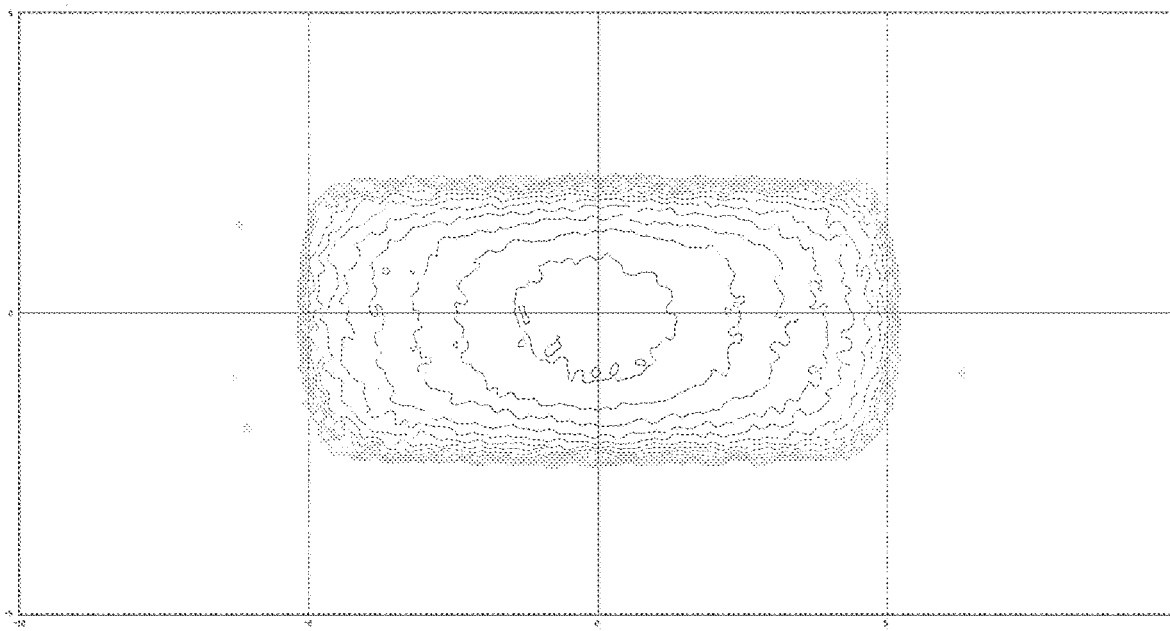
FIG. 11 is a schematic diagram of a light shape formed on the screen when the rectangular LED light-emitting chip is defocused forward or backward by 4 mm of the invention.
Figure 12:
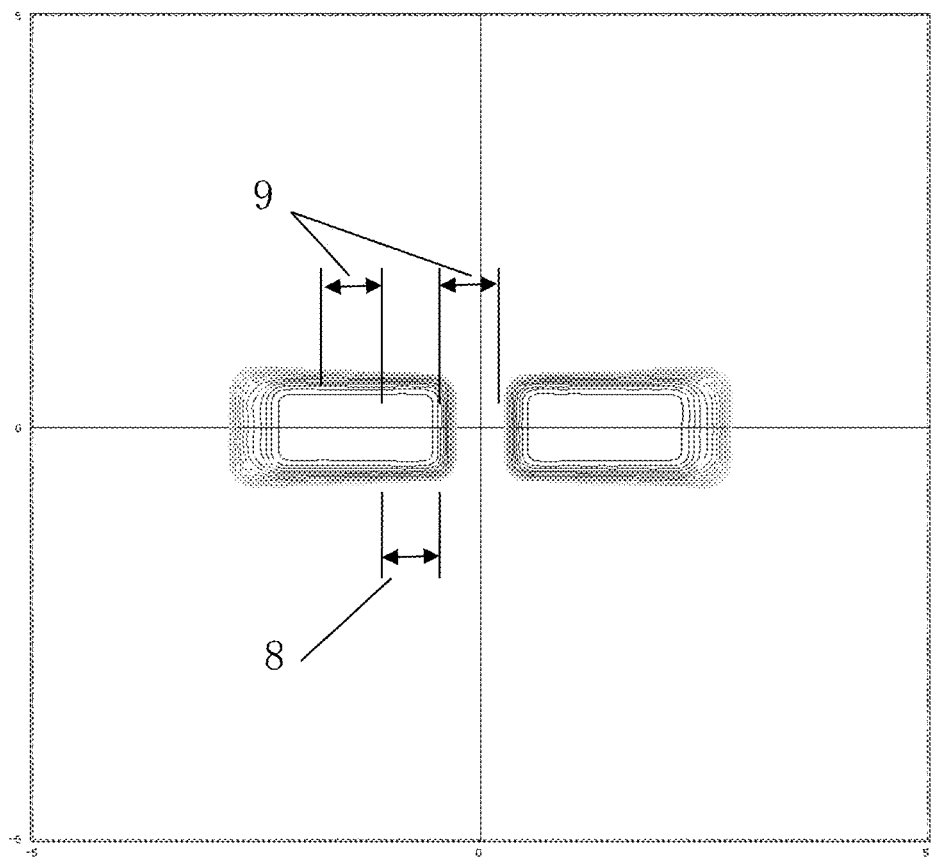
FIG. 12 is a schematic diagram of a light shape formed on the screen when the square LED light-emitting chip of the present invention transversely and quickly reciprocates, the light shape is superimposed and the partial area is turned off.

In the figures: 1, LED light source; 2, lens or lens group corresponding to the light source; 3, secondary light distribution component; 4, imaging lens group; 5, PBS; 6, camera CMOS chip; 7, LCD, LCOS chip or DMD chip arranged on the PBS and opposite to the lens group and used to form a dark area; 8, real dark area; 9, transitional dark area; S, movement speed of light shape.

DETAILED DESCRIPTION OF THE INVENTION

A Polarizing Beam Splitter (PBS)-based Adaptive Driving Beam (ADB) function adjustment method adopts a camera-integrated intelligent vehicle light module which comprises an intelligent illumination light control system composed of a light source system and a light control element and an integrated intelligent vehicle light module composed of a photosensitive chip integrated circuit and an imaging lens group.

The intelligent illumination light control system comprises a PBS, a camera Complementary Metal-Oxide-Semiconductor (CMOS) chip and an imaging lens group, wherein the PBS is provided with a Liquid Crystal Display (LCD), a Liquid Crystal On Silicon (LCOS) chip or a Digital Mircomirror Device (DMD) chip opposite to the imaging lens group, the LCD is controlled through a liquid crystal technique, the LCOS chip is a reflective liquid crystal technique, the DMD chip is micromirror wafer technique, and the LCD, the LCOS chip and the DMD chip are used to realize a dark area.

One part of light rays emitted by the intelligent illumination light control system penetrate through the PBS and are irradiated on the imaging lens group to finally form an illumination light shape.

The other part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip. Ambient light enters the imaging lens group in a direction opposite to an illumination light path.

One part of the ambient light is reflected by the PBS to the photosensitive chip integrated circuit to form an information source, information about vehicles and pedestrians on a road is determined after analysis and processing by a computing system of the integrated circuit, and the intelligent illumination light control system is controlled to carry out ADB function adjustment and control.

The light source system of the camera-integrated intelligent vehicle light module collimates Lambertian-like divergent light rays emitted by an LED light source through a lens corresponding to the light source to form illumination light rays nearly in parallel, the illumination light rays pass through the PBS and the imaging lens group to form a primary light spot and a primary light shape thereof on a front vertical screen, and the primary light shape is a 0.5° intensive light spot formed around the primary light spot.

The light source is transversely displaced with respect to the lens corresponding to the light source to form a secondary spot light and a continuous secondary light shape thereof.

On this basis, the light source is switched off when moving to a certain position in each cycle, and is in an on state in the other positions, such that a light shape having a dark area is formed on the front vertical screen when the light source is located at the switched-off position, thus realizing an ADB function. The dark area includes a transitional dark area formed in the moving process of the light source and located between the primary light source and the dark area formed when the light source moves to the switched-off position, namely a low-brightness transitional area, and a real dark area corresponding to the switched-off position of the light source.

A secondary light distribution component is additionally disposed between the light source and the lens corresponding to the light source to change a light shape, and the secondary light distribution component is used to change the primary light shape in shape and position.

A rotary light source device is used to enable the light source to quickly and linearly reciprocate with respect to the lens. A rotary light source system comprises a light source assembly composed of a LED light-emitting chip and a metal substrate, the light source assembly is able to rotate at a high speed around a normal rotation axis of a light-emitting surface, and the rotation frequency of the light source assembly is not lower than a visually recognizable frequency. The rotary light source system comprises a heat sink arranged on the LED light-emitting chip.

In addition, the light source comprises multiple LED light-emitting chips that can be defocused forward or backward by 0-5 mm with respect to the focal point of the lens or lens group corresponding to the light source to realize multi-dimensional ADB function adjustment.

The movement frequency of the LED light-emitting chip is 50 THz, the on-off frequency of the LED light-emitting chip is 1000 THz, and the rotary light source is switched on or off every 1 ms to form a 0.5° dark area around a real dark area, namely the low-brightness transitional area, and the real dark area formed when the light source is switched off within 1 ms.

According to the invention, an ideal high-beam illumination light shape with the brightness becoming dark gradually from the center is realized by means of light energy distribution control fulfilled by superposition of dynamic light shapes.

According to the invention, the ADB uniformity can be improved by means of a dynamic change and superposition of light shapes.

According to the invention, the camera-integrated intelligent module can reduce error sources and shorten the response time. In addition, the camera system shares one lens group with the intelligent vehicle light system, so that the number of parts and the cost are reduced, and the utilization rate of the lens group is increased.

According to the invention, error sources are reduced, and an extremely small dark area can be generated, so that the control precision of the intelligent vehicle light module is improved. The response time can be greatly shortened.

According to the invention, multiple LED light-emitting chips are adopted and can be defocused forward or backward with respect to the lens or lens group to realize multi-dimensional ADB function adjustment, that is, ADB function control is carried out for upper, lower, left and right objects in front of a vehicle light by different distances.

What is claimed is:

1. A Polarizing Beam Splitter (PBS)-based Adaptive Driving Beam (ADB) function adjustment method, adopting a camera-integrated intelligent vehicle light module which comprises an intelligent illumination light control system composed of a light source system and a light control element and an integrated intelligent vehicle light module composed of a photosensitive chip integrated circuit and an imaging lens group, wherein:

the intelligent illumination light control system comprises a PBS, a camera Complementary Metal-Oxide-Semiconductor (CMOS) chip and an imaging lens group, wherein the PBS is provided with a Liquid Crystal Display (LCD), a Liquid Crystal On Silicon (LCOS) chip or a Digital Mircomirror Device (DMD) chip opposite to the imaging lens group, the LCD is controlled through a liquid crystal technique, the LCOS chip is a reflective liquid crystal technique, the DMD chip is micromirror wafer technique, and the LCD, the LCOS chip and the DMD chip are used to realize a dark area;

one part of light rays emitted by the intelligent illumination light control system penetrate through the PBS and are irradiated on the imaging lens group to finally form an illumination light shape;

another part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;

ambient light enters the imaging lens group in a direction opposite to an illumination light path;

one part of the ambient light is reflected by the PBS to the photosensitive chip integrated circuit to form an information source, information about vehicles and pedestrians on a road is determined after analysis and processing by a computing system of the integrated circuit, and the intelligent illumination light control system is controlled to carry out ADB function adjustment and control;

a camera shares one lens or imaging lens group with a vehicle light, the intelligent illumination light control system and the PBS;

the other part of the light rays emitted by the intelligent illumination light control system are reflected by the PBS in the direction opposite to the camera CMOS chip, so that the illumination light rays are prevented from being irradiated onto the photosensitive chip, which may otherwise disturb the photosensitive chip.

2. The PBS-based ADB function adjustment method according to claim 1, wherein the PBS is arranged on a focal point or a focal plane of a lens or the imaging lens group.

3. The PBS-based ADB function adjustment method according to claim 1, wherein one part of the light rays emitted by the intelligent illumination light control system penetrate through the PBS and are irradiated on the imaging lens group to finally form the illumination light shape.

4. The PBS-based ADB function adjustment method according to claim 1, wherein the light source system of the camera-integrated intelligent vehicle light module collimates Lambertian-like divergent light rays emitted by an LED light source through a lens corresponding to the light source to form illumination light rays nearly in parallel, the illumination light rays pass through the PBS and the imaging lens group to form a primary light spot and a primary light shape thereof on a front vertical screen, and the primary light shape is an intensive light spot formed around the primary light spot;

the light source is transversely displaced with respect to the lens corresponding to the light source to form a secondary spot light and a continuous secondary light shape thereof;

on this basis, the light source is switched off when moving to a certain position in each cycle, and is in an on state in other positions, such that a light shape having a dark area is formed on the front vertical screen when the light source is located at the switched-off position, and the method of forming a dark area by the LCD, the LCOS chip or the DMD chip arranged on the PBS and opposite to the imaging lens group can be replaced to realize an ADB function.

5. The PBS-based ADB function adjustment method according to claim 4, wherein the light source quickly and linearly reciprocates in a transverse area to form a continuous illumination light shape.

6. The PBS-based ADB function adjustment method according to claim 4, wherein a rotary light source device is used to enable the light source to quickly and linearly reciprocate with respect to the lens.

7. The PBS-based ADB function adjustment method according to claim 4, wherein a rotary light source system is a light source assembly composed of a LED light-emitting chip and a metal substrate, and the light source assembly is able to rotate at a high speed around a normal rotation axis of a light-emitting surface, and a rotation frequency of the light source assembly is not lower than a visually recognizable frequency.

8. The PBS-based ADB function adjustment method according to claim 7, wherein the rotary light source system comprises a heat sink arranged on the LED light-emitting chip.

9. The PBS-based ADB function adjustment method according to claim 4, wherein a displacement frequency of the light source with respect to the corresponding lens is greater than the number of visually recognizable frames, that is, the displacement frequency is greater than 30 frames per second.

10. The PBS-based ADB function adjustment method according to claim 1, wherein the primary light shape is a 0.5° intensive light spot formed around the primary light spot.

11. The PBS-based ADB function adjustment method according to claim 1, wherein the dark area includes a transitional dark area formed in a moving process of the light source and located between the primary light source and the dark area formed when the light source moves to the switched-off position, namely a low-brightness transitional area, and a real dark area corresponding to the switched-off position of the light source.

12. The PBS-based ADB function adjustment method according to claim 1, wherein a secondary light distribution component is additionally disposed between the light source and the lens corresponding to the light source to change a light shape, and the secondary light distribution component is used to change the primary light shape in shape and position.

13. The PBS-based ADB function adjustment method according to claim 1, wherein a movement frequency of the LED light-emitting chip is 50-500 HTz, and an on-off frequency of the LED light-emitting chip 1000-50000 HTz.

14. The PBS-based ADB function adjustment method according to claim 13, wherein the movement frequency of the LED light-emitting chip is 50 THz, the on-off frequency of the LED light-emitting chip is 1000 THz, and the rotary light source is switched on or off every 1 ms to form a 0.5° dark area around a real dark area, namely a low-brightness transitional area, and the real dark area formed when the light source is switched off within 1 ms.

15. The PBS-based ADB function adjustment method according to claim 1, wherein the light source comprises multiple LED light-emitting chips that can be defocused forward or backward by 0-5 mm with respect to the focal point of the lens or lens group corresponding to the light source to realize multi-dimensional ADB function adjustment.

16. A camera-integrated intelligent vehicle light module, comprising an intelligent illumination light control system composed of a light source system and a light control element and an integrated intelligent vehicle light module composed of a camera Complementary Metal-Oxide-Semiconductor (CMOS) integrated circuit and an imaging lens group, wherein:
the intelligent illumination light control system comprises a Liquid Crystal Display (LCD), a Liquid Crystal On Silicon (LCOS) chip or a Digital Mircomirror Device (DMD) chip which is arranged on a Polarizing Beam Splitter (PBS) and opposite to the imaging lens group, the LCD is controlled through a liquid crystal technique, the LCOS chip is a reflective liquid crystal technique, the DMD chip is micromirror wafer technique, and the LCD, the LCOS chip and the DMD chip are used to realize a dark area;
the intelligent illumination light control system further comprises the PBS;
one part of light rays emitted by the intelligent illumination light control system penetrate through the PBS and are irradiated on the imaging lens group to finally form an illumination light shape;
another part of the light rays emitted by the intelligent illumination light control system are reflected by the PBS in a direction opposite to the camera CMOS chip, so that light emitted by an illumination system is prevented from being irradiated onto the CMOS chip, which may otherwise disturb the CMOS chip;
ambient light enters the imaging lens group in a direction opposite to an illumination light path;
one part of the ambient light is reflected by the PBS to a photosensitive chip integrated circuit to form an information source to convert a light signal into an electric signal, and a computing system analyzes the electric signal to draw a conclusion and transmits an operation result to an execution system of a control circuit board including the LCD, the LCOS chip and the DMD chip; after the operation result is analyzed and processed, information about vehicles and pedestrians on a road is determined; and the intelligent illumination light control system is controlled to carry out ADB function adjustment and control;
a camera shares one lens or imaging lens group with a vehicle light, the intelligent illumination light control system and the PBS;
the other part of the light rays emitted by the intelligent illumination light control system are reflected by the PBS in the direction opposite to the camera CMOS chip, so that the illumination light rays are prevented from being irradiated onto the photosensitive chip, which may otherwise disturb the photosensitive chip.

17. The camera-integrated intelligent vehicle light module according to claim 16, wherein:
one part of the light rays emitted by the intelligent illumination light control system penetrate through the PBS and are irradiated on the imaging lens group to finally form an illumination light shape meeting law requirement.

* * * * *